Dec. 7, 1965     R. E. STANTON     3,222,269
APPARATUS FOR PRODUCING HYPOCHLORITE SOLUTIONS AND
INTRODUCING SAME INTO CONFINED BODIES OF WATER
Filed March 28, 1962     5 Sheets-Sheet 1

INVENTOR.
ROBERT E. STANTON
BY
Anderson, Spangler & Wymore
ATTORNEYS

INVENTOR.
ROBERT E. STANTON
BY
Anderson, Spangler & Dymond
ATTORNEYS

Dec. 7, 1965 R. E. STANTON 3,222,269
APPARATUS FOR PRODUCING HYPOCHLORITE SOLUTIONS AND
INTRODUCING SAME INTO CONFINED BODIES OF WATER
Filed March 28, 1962 5 Sheets-Sheet 5

INVENTOR.
ROBERT E. STANTON
BY
Anderson, Spangler & Wymond
ATTORNEYS

3,222,269
APPARATUS FOR PRODUCING HYPOCHLORITE SOLUTIONS AND INTRODUCING SAME INTO CONFINED BODIES OF WATER
Robert E. Stanton, 171 Downing St., Denver, Colo.
Filed Mar. 28, 1962, Ser. No. 183,242
12 Claims. (Cl. 204—270)

This invention refers to the treatment of water contained in swimming pools, ponds, cisterns and the like, and it relates more particularly to the purification of biologically contaminated water by the use of hypochlorite compounds.

Untreated water employed for drinking or bathing purposes frequently may present a serious health hazard to individuals and to communities by reason of the biologically active contaminants, such as pathogenic organisms, putrescent substances or the various plant growths contained therein. In many instances these contaminants also will impart objectionable odor, taste, color or turbidity to the water unless they either are removed or substantially reduced by appropriate treatment.

Many conventional methods used for treating biologically contaminated water are based upon the chemical action of chlorine or various chlorine-releasing compounds. While the direct introduction of gaseous chlorine from a pressurized source probably represents the simplest form of water treatment, this method has the disadvantages of requiring heavy and cumbersome pressure-type storage cylinders to contain the supply of liquid or gaseous chlorine, and an expensive and delicately balanced metering system for regulating the delivery of the gas.

Chlorine-containing compounds such as granular solid-type hypochlorite preparations, generally will contain about 35% available chlorine, but have the disadvantage of being difficult to distribute uniformly throughout a large volume of water in addition to being quite costly.

Domestic type laundry bleach solutions containing 3% to 5% available chlorine as sodium hypochlorite also may be used for this purpose, although they share equal disadvantages with the solid hypochlorite preparations in being both an expensive source of chlorine and difficult to introduce in uniform proportions into large volumes of untreated water.

The hypochlorites used for water treatment purposes ordinarily are produced by reacting gaseous chlorine with a hydroxide of sodium, potassium or calcium, under carefully controlled conditions. The chlorine, together with the desired hydroxide compounds are readily obtainable by simple electrolysis of an aqueous solution of the corresponding chloride salt. For example, a sodium chloride brine may be electrolyzed to form chlorine and sodium hydroxide according to the equation:

$$NaCl + H_2O + (53 \text{ Cal.}) = NaOH + \tfrac{1}{2}H_2 + \tfrac{1}{2}Cl_2 \quad (1)$$

The chlorine and sodium hydroxide obtainable from the electrolysis of sodium chloride brine may be reacted at temperatures below 35° C. to yield sodium hypochlorite according to the equation:

$$2NaOH + Cl_2 = NaOCl + NaCl + H_2O \quad (2)$$

Unless the heat of the latter reaction is dissipated rapidly, the temperature of the system may exceed 35° C., which promotes the formation of objectionable chlorate compounds according to the equation:

$$3NaOCl + (\text{heat}) = NaClO_3 + 2NaCl \quad (3)$$

Chlorate formation may represent a substantial loss of valuable hypochlorite product from the system, since the chlorates are not particularly effective in the treatment of biologically contaminated water.

The cost of manufacturing sodium hypochlorite bleach solutions for domestic consumption in accordance with reactions (1) and (2) may be quite nominal, although the delivered costs of the product invariably will be high, due to the common practice of producing aqueous solutions containing about 95% of water and other inert substances and the necessity for packaging and transporting the highly corrosive liquid in expensive glass or plastic containers which conform with interstate shipping regulations.

An average family size swimming pool containing 15,000 to 25,000 gallons of water, ordinarily will require dosing with about 5 to 10 gallons per week of domestic laundry bleach solution during the periods of active use, in order to maintain the purity of the water within acceptable limits. Usually, this dosing consists simply in dumping the contents of one or more standard 1 gallon jugs of bleach solution into the pool, followed by prolonged periods of stirring or circulating the water to promote an effective distribution of the hypochlorite therein, and to avoid any localized concentrations of the reagent which could be injurious or irritating to the eyes or skin of bathers. Furthermore, the metal pool fixtures may be severely corroded by contact with the dumped hypochlorite bleach solution before a proper degree of dilution has been achieved, and the pool ordinarily must be vacated by bathers until the dosing and mixing procedures have been reasonably completed.

All of the above mentioned disadvantages, together with other objectionable features relating to the purification of biologically contaminated water with hypochlorite solutions, either can be avoided or greatly alleviated by the use of my invention as herein illustrated and described.

Briefly, my invention permits the purification of relatively large volumes of water to be achieved conveniently and economically by continuously producing electrolytically a hypochlorite solution from a brine consisting of a small portion of the water being purified and an appropriate chloride salt, and thereafter introducing the hypochlorite solution into the substantially larger remaining portion of the water being treated at a rate approximately equal to the rate of hypochlorite formation so that excessive concentration of the latter is avoided. The several steps comprising my invention preferably are conducted immediately below the surface of the volume of water brine treated in order to dissipate the heats of the reactions therein and to maintain the temperatures within a range which avoids substantial formation of chlorates.

Proper regulation of the electrolysis step allows only about one-half of the chloride salt to be converted into reaction products, so that the conductivity of the electrolyte does not become lowered to a point which would adversely affect the rate of the efficiency of the conversion. Accordingly, the hydroxide product becomes dissolved in the unreacted one-half of the brine and is withdrawn from the electrolysis cells in solution, while hydrogen and chlorine are generated in the reaction in a gaseous form and will bubble upwardly through the liquid. My invention employs the kinetic effect of the rising gas bubbles in a manner hereinafter disclosed, to produce the required flow of reactants and products throughout the entire sequence of operating steps without the use of conventional pumping or circulating devices.

Any chlorides of the alkali or alkali-earth groups which are commonly recognized in the art as sources of electrolytic chlorine and hydroxides, also may be employed for identical purposes in the practice of my invention, although I prefer to use ordinary table salt, or sodium chloride, on account of its low cost, availability, and high degree of chemical stability which assures relaitvely safe and convenient handling.

Table salt frequently is supplied for household purposes in disposable cardboard cartons which contain about two pounds of finely granulated salt product. One of the embodiments of my invention employs apparatus hereinafter described and illustrated, which can be adapted to receive a charge of salt in the form of an unbroken carton or package.

It is, therefore, the principal object of my invention to provide a novel method and apparatus for continuously purifying contained bodies of water such as, for example, in swimming pools and the like.

A second objective of the instant invention is the provision of a miniaturized hypochlorite production plant designed to be floated in the body of water the hypochlorite produced thereby is to purify.

Another object is to provide means of the class described capable of continuously generating a supply of hypochlorite and simultaneously introducing same into the water to be treated therewith.

Still another objective of the invention herein disclosed is to provide a miniaturized production facility of hypochlorite which utilizes the water being treated as one of the reactants and also as a heat sink to control the heat of reaction.

An additional object is the provision of apparatus for the production of hypochlorite that utilizes the kinetic energy of the gaseous reaction products to accomplish the desired flow and circulation of the reactants through the several processing stages.

Further objects of my invention are to provide a hypochlorite production method and apparatus that are economical both from the standpoints of initial cost and operating expense, a system which avoids localized high concentrations which might be injurious to persons and equipment, a unit that is compact and can be left floating in the water being treated at all times due to its decorative appearance, and apparatus specifically adapted to accept common table salt in ordinary cardboard containers as the source of chloride ion.

Other objects will be in part apparent and in part pointed out specifically hereinafter in connection with the description of the drawings that follows, and in which.

Figures 6, 7, 8:
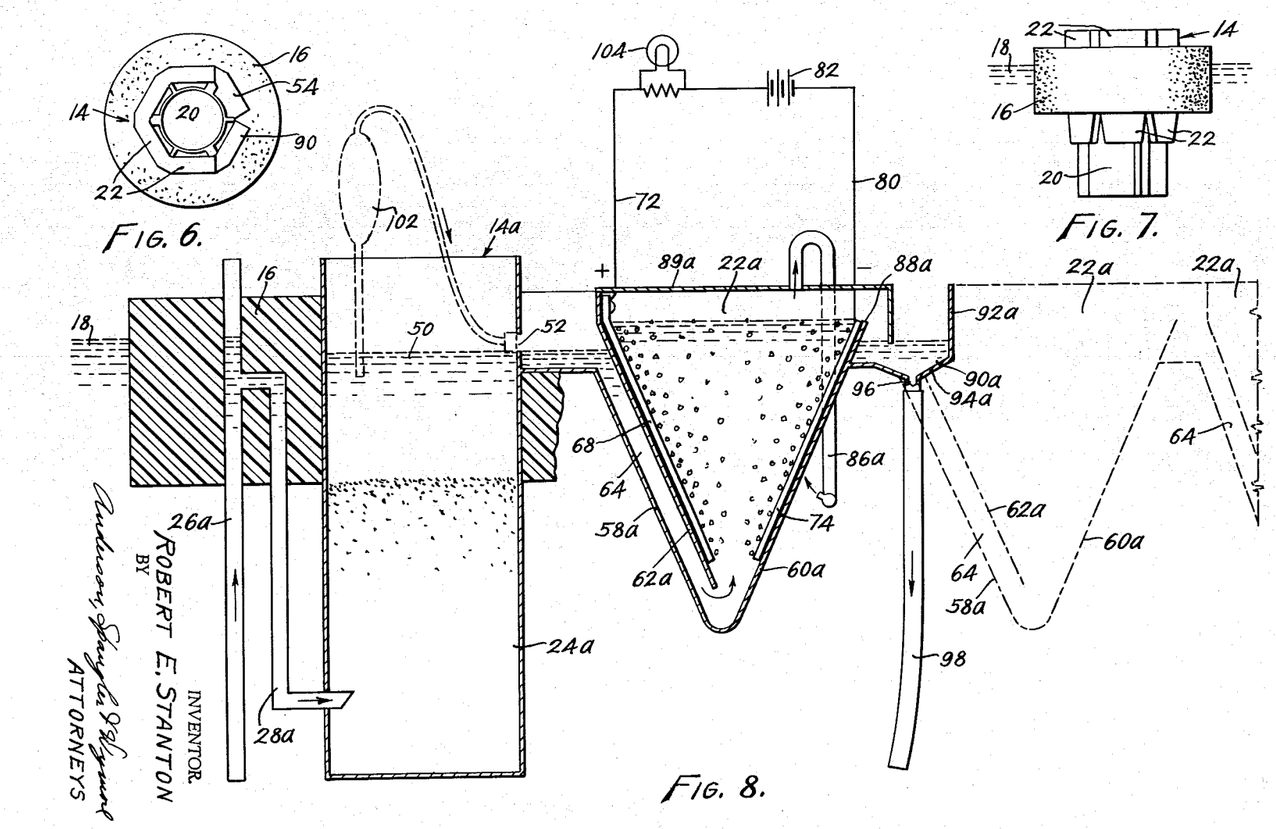
FIGURE 6 is a top plan view to a reduced scale showing the apparatus of FIGURE 1 mounted in the floating ring that provides the support therefor.
FIGURE 7 is a side elevation of the apparatus of FIGURE 6.
FIGURE 8 is a vertical section similar to FIGURES 4 and 5 showing a single-celled embodiment of the apparatus.

Referring now to the drawings for a detailed description of the present invention, and initially to FIGURES 6 and 7 for this purpose, reference numeral 14 designates in a general way a miniaturized hypochlorite production facility which is attached to a float 16 that supports same in a confined body of water 18. The float 16 may consist of any buoyant material capable of supporting the apparatus in water; however, it is contemplated that one of the several rigid forms of polystyrene or polyurethane molded into the shape of a hollow ring will be used for this purpose.

As the description proceeds, frequent reference will be made to the body of water undergoing treatment as the source of water for dissolving the salt, the electrolysis reaction, the cooling medium and the buoyant support for the apparatus as this is the simplest and most efficient form of the invention. It is to be clearly understood, however, that the body of water performing the above-mentioned significant functions may, if desired, be entirely separate from the body of water requiring purification. For example, by floating the apparatus in a separate tub of water and discharging only the product into the pool, any objection that bathers might have to swimming in a pool containing electrical apparatus would be eliminated.

Basically, the apparatus involved in the production of hypochlorite from water and a chloride-containing salt by electrolysis consists of a brine tank and one or more electrolytic cells that have been broadly designated by reference numerals 20 and 22, respectively. The cells 22 are preferably arranged in a ring around the inside of the float surrounding the brine tank 20. This entire assembly including the brine tank, cells and float is floated on the surface of the water being treated, the latter forming the source of the water required in the electrolysis reaction and also the coolant that prevents the formation of the bothersome quantities of the chlorate.

The reaction is initiated in the brine tank 20 which will now be described in detail with reference to FIGURES 1 and 4. In the particular form shown, the tank comprises an open-topped hollow cylindrical vessel 24 that is preferably molded out of plastic to reduce the cost thereof, render it lightweight and eliminate the necessity for insulating same from the electrolysis cells and associated conductors. The vessel 24 is supported by the float so that all but the top thereof is submerged in the water to be treated. Water enters the brine tank through one or more vented passages 26 that open beneath the surface of the water. A branch passage 28 has its inlet connected into passage 26 beneath the vent and the level to which the water rises therein so as to conduct the water into the bottom of the brine tank where its outlet is located. In the form shown in FIGURES 1 and 4, riser passage 26 and sealed passage 28 are molded within ribs 30 that project from the exterior of the tank; however, it is obvious that a vented rise pipe 26a and seal pipe 28a could also be used for the same purpose such as have been shown in FIGURE 8.

In the interests of simplicity, vessel 24 is sized to receive an ordinary cardboard salt container 32 of the type obtainable from almost any grocery store. By using common table salt in packaged form, much of the inconvenience associated with the filling of the tank and cleaning same are eliminated. The container 32 will, of course, become water-logged almost immediately upon immersion in the tank; therefore, a wire basket 34 is preferably provided to facilitate insertion and removal. This basket, as shown, provides a grid 36 adapted to support the bottom of the container, an overhanging portion 38 positioned to overlie the top of the container and prevent it from floating to the top of the tank, and a handle forming portion 40 which facilitates lifting the spent salt container from the tank. As illustrated, vertically-disposed grooves 42 are provided in the walls of the vessel 24 which slidably receive vertical elements of the basket and prevent relative rotation therebetween.

In order to insure that the water issuing from the outlet passage 28 percolates through the salt confined within the container 32 rather than flowing upwardly around the outside of the latter, means are provided adjacent each outlet in the base of the tank to puncture the container and subsequently hold the punctured aperture open. Such means includes a pair of horizontally-spaced essentially vertical cutters 42 having downwardly and inwardly inclined knife edges 44 on their upper extremities in position to cut into the bottom and cylindrical sidewall of the descending salt container thus separating a tab therefrom along two sides. These cutters are disposed adjacent each outlet of the passages 28 on opposite sides thereof. Obviously, by merely cutting a tab free of the container along two sides does not, in itself, insure an opening of sufficient size to allow the water to enter freely; therefore, the cutters are supplemented by inwardly bowed elements 46 located therebetween in overlying relation to the outlet of passage 28. These bowed elements cooperate with the cutters to push the tab free by the latter inwardly thereby allowing the water to enter the container. In the particular form shown herein, elements 46 comprise spring members secured to the wall of vessel 24 along their top edges only, thus leaving the lower edges free to slide downwardly along said wall in a manner to straighten out the bow therein as the bottom of the container passes alongside into final position resting on grid 36 of basket 34. Note in this connection that overhanging portion 38 of the basket prevents the carton 34 from rising as it contacts the cutters and associated bowed element.

The untreated water entering the bottom of tank 20 flows into the bottom of the salt container through the openings punched therein percolating up through the salt bed and out through previously-opened pouring spout 48 to produce a supernatant layer of substantially saturated sodium chloride brine 50 (FIGURE 8) rising about two inches above the top of the carton or salt bed as determined, of course, by the depth to which the float allows the brine tank to sink. While common table salt is preferred as a source of the chloride ion and the action of the hydroxide needed for the electrolysis step, as has already been mentioned, other alkali and alkaline-earth chlorides capable of being reacted electrolytically to release gaseous chlorine are also satisfactory. Therefore, even though repeated reference will be made to sodium chloride as one of the principal reactants, it is to be understood that such statements are intended as being merely illustrative of one of the several chloride-containing salts that can be used and that the invention is by no means restricted to its use alone.

An outlet 52 is provided in the wall of the brine tank at a level somewhat below that to which the water rises on the outside of the tank thus permitting the brine to overflow into a trough-like tray or plenum 54 which is shaped to deliver same to the first of the electrolytic cells 22. The construction and arrangement of these cells can best be seen in FIGURES 1, 2 and 3 to which reference will now be made for a detailed description thereof.

Figures 1, 2, 3:
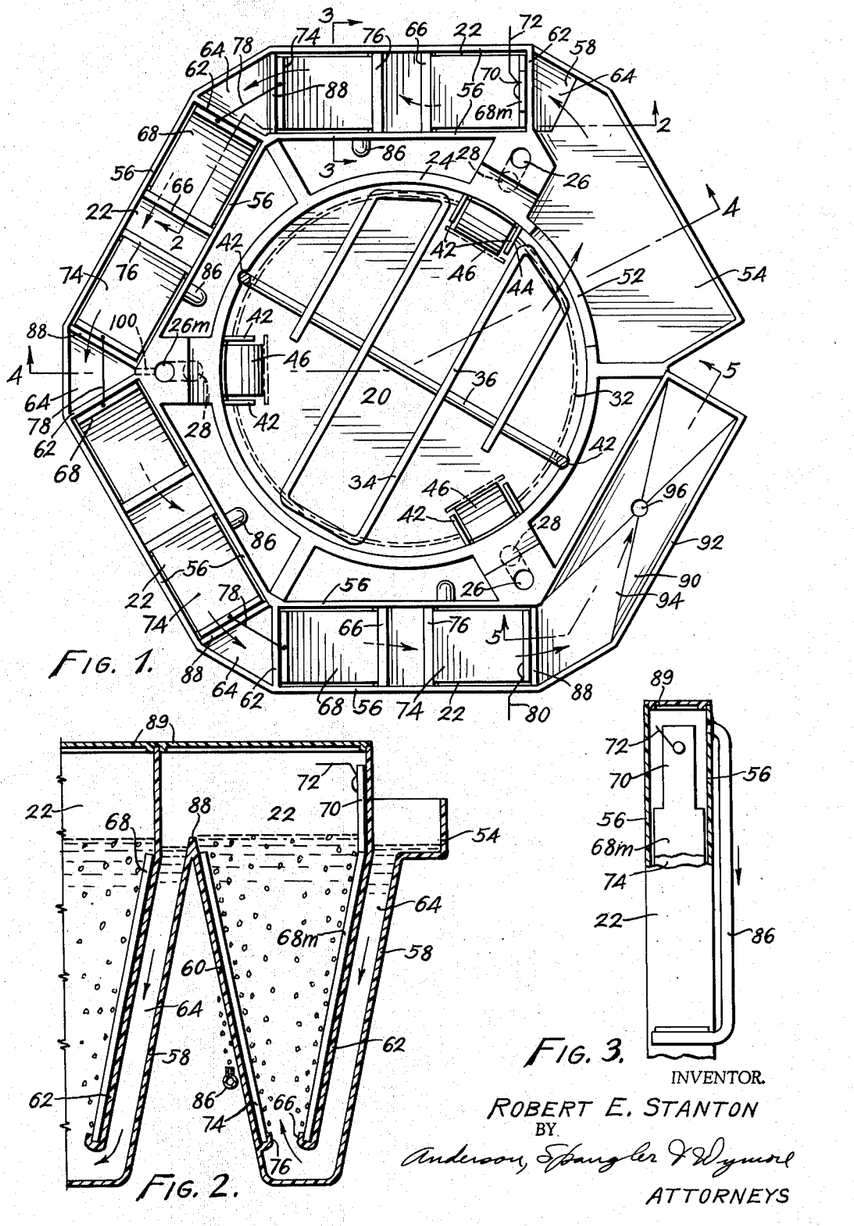
FIGURE 1 is a top plan view illustrating a multi-celled embodiment of my hypochlorite production apparatus.
FIGURE 2 is a fragmentary section taken along line 2—2 of FIGURE 1 illustrating the electrolytic cell configuration.
FIGURE 3 is a fragmentary section taken along line 3—3 of FIGURE 1 showing another view of the cell.

A more compact structure results when several cells are employed by arranging them in a more or less circular or polygonal pattern around the periphery of the brine tank as indicated in FIGURE 1. All of the cells may be identical and are preferably constructed of a suitable corrosion resistant moldable plastic material which requires no insulation. In fact, the cells and brine tank can be molded of the same plastic material in the form of a more or less single-piece unit.

The cells are of a unique design in that they provide for a steadily increasing cross-sectional area from the bottom to a point near the top for a purpose which will be outlined presently and they also include means by which the escaping gases are utilized to stir up the water surrounding the apparatus thus providing more efficient heat transfer. The cells of FIGURES 1, 2 and 3 include a pair of spaced substantially parallel sidewalls 56 of inverted generally triangular shape that are joined together along their edges by a pair of downwardly and inwardly inclined end walls 58 and 60. In order to group the cells in a polygonal arrangement around the periphery of the brine tank, the end walls 58 and 60 are not parallel as wall 58 is located at the corner in the manner shown in FIGURE 1. A partial partition wall 62 is provided in each cell extending between the side walls 56 and cooperating with end wall 58 to define a downwardly and inwardly inclined passage 64 of substantially uniform cross section. Partition 62 projects above the liquid level in the cell thus separating the interior thereof into two compartments to interconnect with one another at their lower ends where partition 62 terminates short of the bottom of the cell. The upper end of passage 64 of the first cell in the series opens into plenum 54 to receive brine directly from the brine tank. The lower margin of partition wall 62 is formed to provide an upturned portion 66 which receives the lower edge of anode 68 that extends upwardly along the inside of said partition. The anode is fabricated from a flat strip of carbon or other suitable anode-forming material. While graphite carbon plates are acceptable for both electrodes, it is preferable to employ plates of some electrically-conductive material coated with a layer of lead dioxide such as are used in automobile storage batteries. An anode is, of course, provided in each of the cells. The anode 68m in the first cell of the series is modified slightly to include an integrally-formed lug 70 to which the electrical conductor 72 is attached.

The opposing inner face of end wall 60 is fitted with the cathode 74 which is similarly retained in place by upturned integrally-formed lip 76 provided on the inner face of wall 60 near the lower extremity thereof. These lips 66 and 76, of course, maintain the anodes and cathodes of the cell separated from one another. If, as shown, the cells are fabricated from a non-conducting plastic material, no further insulation is necessary.

The cathode of the first cell is electrically connected to the anode of the second cell by a bus bar 78, the cathode of the second cell to the anode of the third, and so on until the last cell of the series is reached whereupon its anode is connected to a conductor 80. Conductor 80 is connected to the negative terminal of a suitable direct current power supply 82 (FIGURE 8) while conductor 72 is connected to the positive side thereof.

Before continuing with the detailed description of the cell structure, it would be well to explain briefly the current requirements of the process and how they may best be satisfied. The current must be delivered to the cells at a potential of between approximately 3.2 and 4.0 volts which, if a single electrolytic cell is used, would require a complicated and expensive current source due to the heavy amperage needed. It is, therefore, preferable to utilize a multiple-cell installation in which several smaller cells are connected together in series to form a cascade thus accomplishing the electrolysis in successive steps at correspondingly lower amperages.

A safe level at which to supply current to apparatus of the type described herein when used in a swimming pool is about 16 volts. A potential of this magnitude is not dangerous to swimmers even though they come into direct contact with the current-carrying elements thereof. By utilizing a 16 volt current supply, four cells in series such as are shown in FIGURE 1 can be used to advantage. Alternatively, a series-parallel circuit with two or more banks of four serially-connected cells with the banks wired in parallel can be used.

Ordinarily, direct current will be supplied to the cells so that the anode and cathode elements maintain their respective positive and negative polarities at all times; however, for purposes of the present invention it is desirable, under certain conditions, to reverse the polarities of the electrodes to avoid polarization of their surfaces due to the formation of gas films thereon. Such reversal of the electrode polarities even at frequent intervals has no adverse effect upon the electrolysis reaction since the anode and cathode products must be combined to form the desired hypochlorite product within the system. As a practical matter, rather than using a battery as indicated at 82 in FIGURE 8 as the source of direct current, it will usually be supplied in the form of ordinary alternating household current through a transformer to a dry-type selenium or silicon rectifier which will convert same to direct current at the desired potential before delivering same to the cells. It is a simple matter to anchor the apparatus near the side of the pool for purposes of supplying power thereto from an outlet in the near vicinity.

Returning once again to FIGURES 1, 2 and 3 in order to complete the description of the cell construction, note the unique arrangement of the anode-cathode pairs in opposed upwardly divergent relationship to one another. This is quite useful in carrying out the electrolysis reaction as the ascending mixture of liquid and gaseous products formed between the electrodes progress upwardly at a relatively uniform rate. In other words, the brine overflowing plenum 54 enters passage 64 of the first cell, flows downwardly in the latter and emerges in the space between the electrodes at their point of closest approach to one another, whereupon, gas bubbles begin to form immediately and steadily increase in number as the mixture ascends and continues to react. Thus, by spreading apart the electrodes at their upper ends, the progress of the mixture is not retarded due to the build-up of bubbles as it rises.

As the brine ascends in the cell, the electric current passing between the electrodes converts the brine into hydrogen and sodium hydroxide at the cathode and chlorine at the anode. The rising volume of gaseous products that forms between the electrodes forces the supernatant liquids upwardly and, in so doing, causes unreacted portions of the brine to react in the same manner at progressively higher levels thereby producing additional liquid and gaseous reaction products. At this point, it should be mentioned that these reaction products, particularly the sodium hydroxide and chlorine, and to a lesser extent the sodium hypochlorite, are injurious to many substances; therefore, the cells must be fabricated from a material which will resist this corrosive action such as, for example, unplasticized polyvinyl chloride.

The mixture of liquid and gaseous reaction products has a substantially lower density than the incoming brine solution so that the reaction mixture will rise higher in the cell than the level maintained by the incoming brine solution. For this reason, the mixture of reaction products will have a sufficient hydrostatic head due to its higher level to overflow into the inclined passage 64 of the second cell. Not all of the brine is reacted in the first cell of the series, therefore, the same reaction takes place in the other cells resulting in the desired low density mixture capable of successive migration through the entire series.

The vigorous interaction of the liquid and gaseous components of the reaction mixture as they ascend in the cells causes a chemical combination between the chlorine gas and the sodium hydroxide to produce the desired end product, namely, sodium hypochlorite. Hydrogen gas, therefore, remains as the only gaseous component reaching the top of the cell in substantial quantities. The reaction mixture remains as a froth or foam at the top of the cell, whereupon, the gaseous and liquid phases separate from one another with the sodium hypochlorite and unreacted brine overflowing into the second cell while the hydrogen gas is taken off through exhaust tube 86.

This exhaust tube 86, one of which is provided in each cell, also forms an important and novel part of the cell. Lids 89 are provided for each cell extending between adjacent partition walls 62 and the side walls thus forming an essentially gas-tight closure over the cell to prevent the escape therefrom except by means of exhaust tube 86. These exhaust tubes open through one of the side walls of the cell and extend downwardly therefrom into the water being treated where they terminate adjacent the exterior surface of the cell. It has already been mentioned that undesirable quantities of chlorate compounds will be produced if the temperature of the system exceeds 35° C. The electrolysis reaction is an exothermic one and the heat thus generated can easily raise the temperature of the system to a point above the 35° C. maximum; therefore, some means for holding the temperature at or below this figure should be provided. It is this function which is performed by exhaust tube 86 which delivers the escaping hydrogen gas into the water adjacent the cell and causes same to circulate more or less continuously much in the manner of a pump. Of course, by continuously agitating the water in the immediate vicinity of the apparatus, the cells are constantly subjected to the cooling effects of the water which dissipates the heat of reaction and then moves away.

The substantially gas-free brine which flows across the upper flume-forming edge 88 of end wall 60 enters the passage 64 of the second cell where it is subjected to further electrolysis. Successive portions of the brine are reacted in each cell until approximately one-half of the brine has been converted into sodium hypochlorite in the cell series.

A product consisting of approximately one-half sodium hypochlorite and one-half sodium chloride dissolved in the proportion of about 30% total solids in 70% water, flows across the flume-forming edge 88 of the last cell into sink 90.

Figures 4, 5:
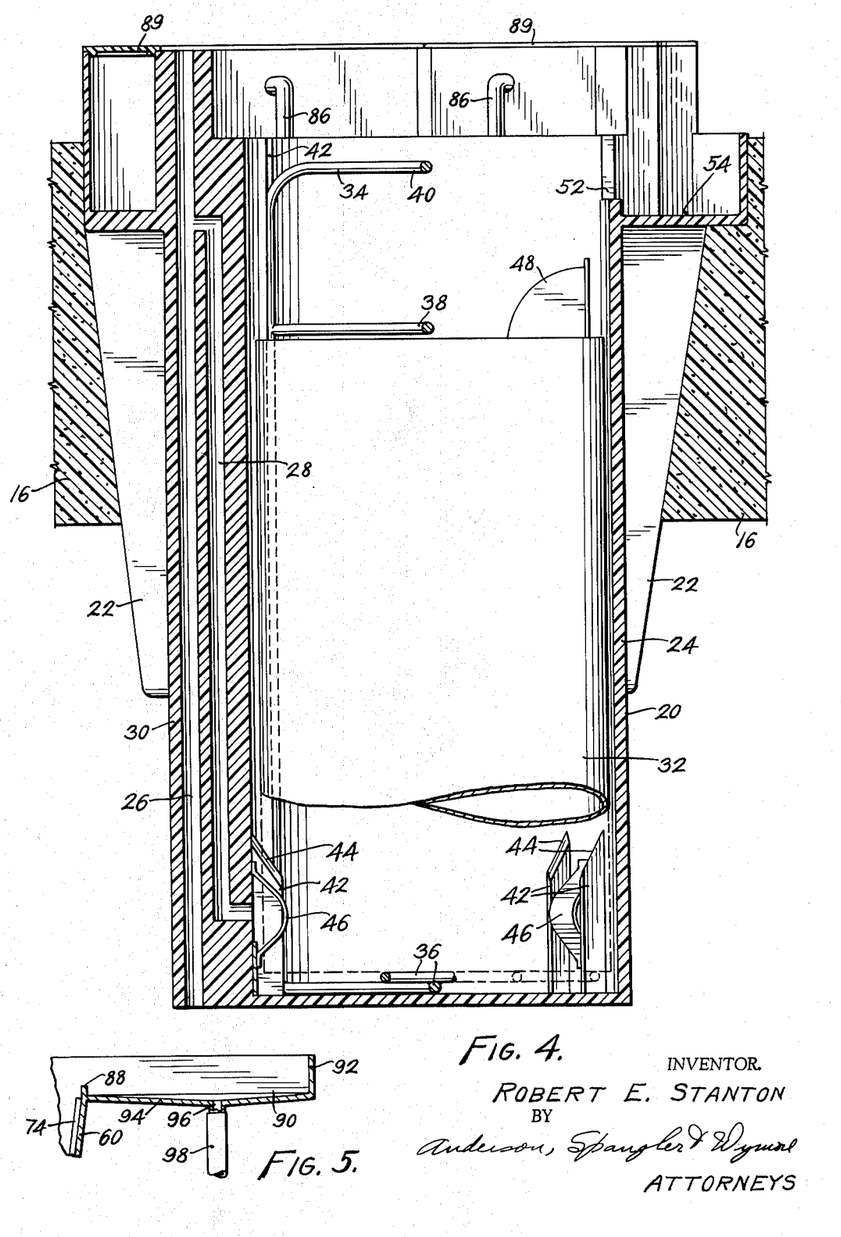
FIGURE 4 is an enlarged fragmentary section taken along line 4—4 of FIGURE 1 showing the chamber in which the salt brine is produced.
FIGURE 5 is a fragmentary section taken along line 5—5 of FIGURE 1 illustrating the discharge by means of which the hypochlorite is introduced into the water being treated.

This sink, which is most clearly revealed in FIGURES 1 and 5, is open at the top and has a rim 92 on three sides thereof which, in cooperation with partition wall 62 of the last cell, encloses a bottom 94 that slopes in all directions toward a drain 96. The underside of the drain 96 has attached thereto a flexible hose 98 that extends downwardly therefrom to the depth beneath the surface of the body of water at which it is desired to introduce the hypochlorite. By locating the outlet of drain tube 98 adjacent one of the water inlets of the pool, the incoming water will insure reasonably uniform distribution of the purifying reagent throughout the entire volume of water contained therein. Actually, it is often possible to vary the rate at which the water enters the pool to correspond approximately with the rate of production of the hypochlorite solution to facilitate relatively uniform distribution of the purifying agent.

Now, it is possible that substantial quantities of water in the brine solution will be lost through chemical or electrolytic decomposition as it progresses through the several cells; therefore, in order to prevent the percentage of solids from becoming unduly high in the brine, it may be desirable to dilute the solution by adding water thereto at some intermediate stage of the reaction. For this purpose, vented passage 26m located between cells two and three of the series is provided with a port 100 opening onto the outer surface of the unit underneath the water level but above the level of the brine in the adjacent downwardly sloping passage 64 into the bottom of the third cell. This outlet 100 supplies water for diluting the brine to the third cell at the same time passages 26 and 28 are supplying water to the brine tank.

In the production of sodium hypochlorite according to the equations set forth earlier, it will be seen that about half of the sodium hydroxide obtained by the electrolysis of salt in equation (1) is again reconverted into the original salt when the hydroxide is reacted with chlorine to form sodium hypochlorite in accordance with equation (2). Since both of these reactions occur about simultaneously in the electrolytic cells, the salt produced by equation (2) merely recycles internally within the cell system to combine with the incoming brine and again is converted into the hydroxide by the reaction of equation (1) until the repeated sequence of operations has converted the original salt charge into the desired yield of hypochlorite product.

Next, with brief reference to the more or less schematic representation of the unit shown, in FIGURE 8, it will be noted that similar elements functionally to those already described in connection with FIGURES 1–7, inclusive, have been identified by corresponding reference numerals to which the postscript "a" has been added for purposes of denoting their slight structural differences where such are present. For example, passages 26a and 28a have been shown in the form of pipes or tubes rather than molded passages. Brine tank 24a is considerably simplified in that it includes no provision for accepting the salt container and forming openings therein, but instead, is designed to receive a charge of salt that is merely poured therein.

As for the cells 22a, they are also very similar to the ones already described and the elements of which they are comprised perform identical functions. By way of example, the end walls 58a and 60a are slightly different at their lower ends and wall 60 and partial wall 62a do not include the upturned portions 66 and 76 (FIGURE 1) that restrain the lower ends of the electrodes. The overflow arrangement 88a is slightly different as is the design of the sink 90a, 92a and 94a. Exhaust tube 86a is shown emerging from the top 89a rather than from a sidewall, however, this again, has no functional significance.

There are, however, a few refinements shown in FIGURE 8 which have not been described before or illustrated in FIGURES 1–7 although they are equally applicable thereto. The first of these is the aspirator 102 shown in dot-dash lines. The purpose of this bulb-type aspirator is to manually pump brine from the tank into the first cell in the event the latter has filled with water while the apparatus is being readied for use but before it has actually been placed in operation. In other words, as soon as the unit is placed in the water, the brine tank will fill and water will overflow into the first cell even though no salt has been added to form the electrolyte which is necessary to start and sustain the reaction. Means for transferring the brine to the first cell of the series is, therefore, a convenient accessory.

A pilot lamp 104 shunted into the power supply to the cells is also a useful addition to the system for purposes of indicating that the electrolyte is sufficiently conductive to permit an adequate flow of current. Of course, other signalling devices well known in the art may be employed for the same purpose.

One other point should be mentioned briefly in connection with the schematic representation of the unit shown in FIGURE 8. In this figure, only a single electrolytic cell has been shown in full lines; however, additional cells have been shown in dotted lines to indicate another type of multiple-cell arrangement that could be employed. In other words, instead of grouping the several cells in a ring about the tank, they could be strung out in a line so that the outlet 96 of the intermediate cells would drain into the downwardly inclined passage 64 of the next cell in the series. Of course, the last cell would be fitted as shown in full lines with the discharge tube 98 through which the hypochlorite solution would be fed into the water being treated.

Finally, with reference to FIGURES 1–9, inclusive, a further modification of the miniaturized hypochlorite production apparatus will now be described in detail. The major modification lies in the different cell construction 22b when compared with the one already described. In the schematic representation of FIGURE 12, the modified cell 22b will be seen to comprise a substantially vertically disposed down-comer tube 64b which corresponds to the downwardly and inwardly inclined passage 64 of the previously-described cell design, an upwardly inclined metal tube comprising the cathode of the cell, a carbon rod 106 disposed coaxially within the metal tube 104 to form the anode, a chamber 108 at the upper terminus of the tube 104 and a gravity-type delivery tube 98b which delivers the hypochlorite reaction product to the water being treated following separation of the gaseous constituent therefrom in chamber 108. Thus, from the brine tank 20b, the brine flows down down-comer 64b into the lower end of upwardly inclined cathode 104 where it is subjected to the electrolysis reaction as it flows upwardly into the chamber 108. As before, the level of the reaction mixture in chamber 108 is somewhat higher than the corresponding brine level in brine tank 20b due to the presence of substantial quantities of the gaseous constituents which cause the mixture to take on the character of a froth or foam. In chamber 108 the hydrogen gas and small residual amounts of chlorine separate from the liquid phase. The liquid phase, consisting of the hypochlorite reaction product and any unreacted brine remaining are drawn off the bottom of separating chamber 108 by the discharge tube 98b.

Figure 12:
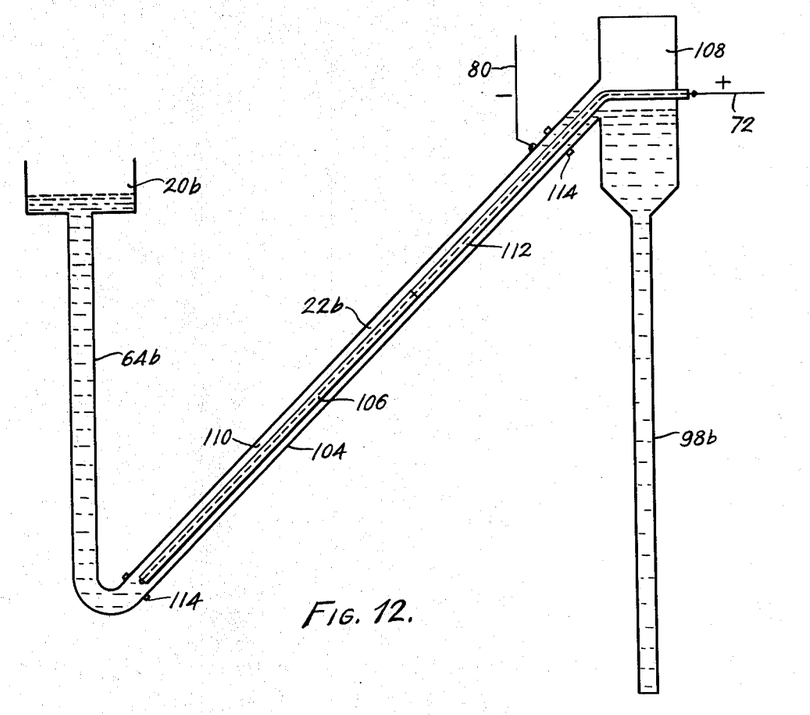
FIGURE 12 is a schematic representation of the apparatus of FIGURE 9.

The electrolyte, of course, flows upwardly in the annular space 110 between the anode and cathode-forming elements 104 and 106. The lead 80 from the negative side of the direct-current power supply is connected directly to the metal tube 104 that comprises the cathode; whereas, the lead 72 from the positive side of the power supply extends downwardly inside the cathode tube through insulator 112 to anode rod 106 which is disposed within the lower portion of the cathode. Accordingly, the electrolysis reaction is confined to the lower portion of inclined tube 104 where the anode is located and the upper portion of this tube which contains the insulators 112, constitutes a mixing zone where the sodium hydroxide and chlorine generated in the electrolysis step combine to produce the hypochlorite reaction product.

Figures 9, 10:
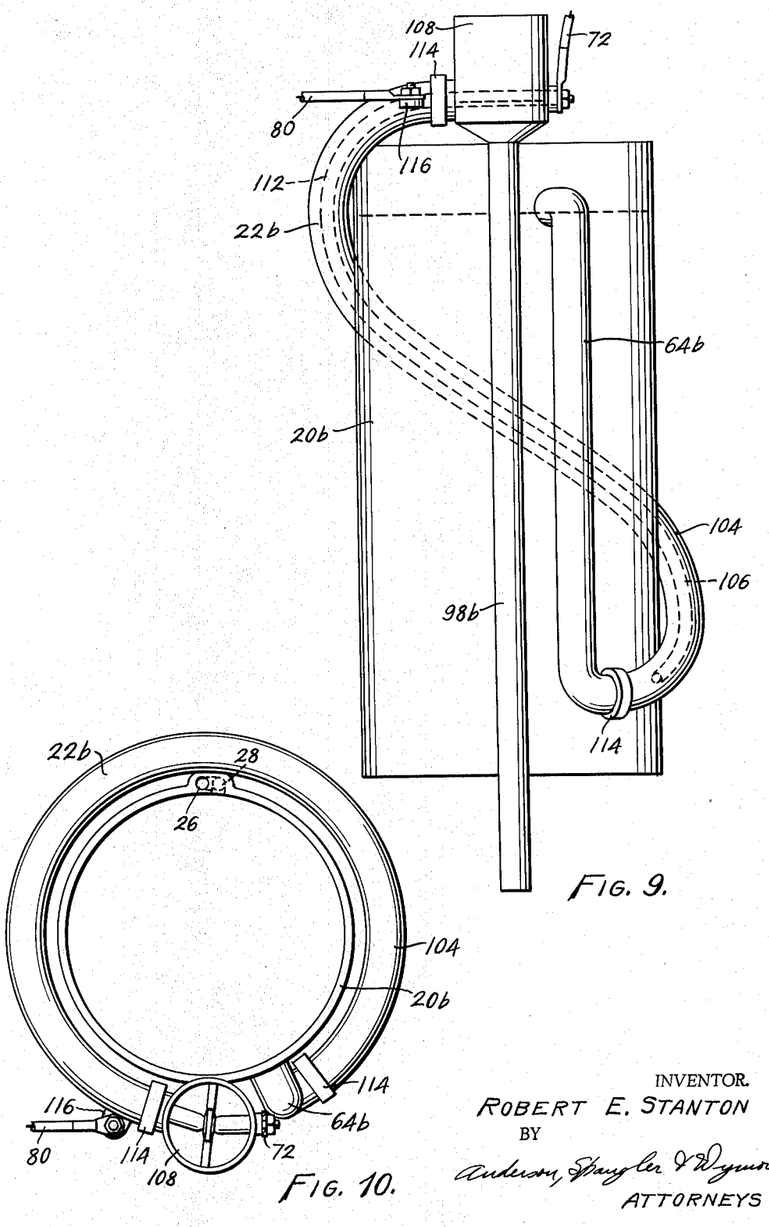
FIGURE 9 is a side elevation of a further modified form of the apparatus that utilizes a different type of electrolytic cell.
FIGURE 10 is a top plan view of the cell of FIGURE 9.
Figure 11:
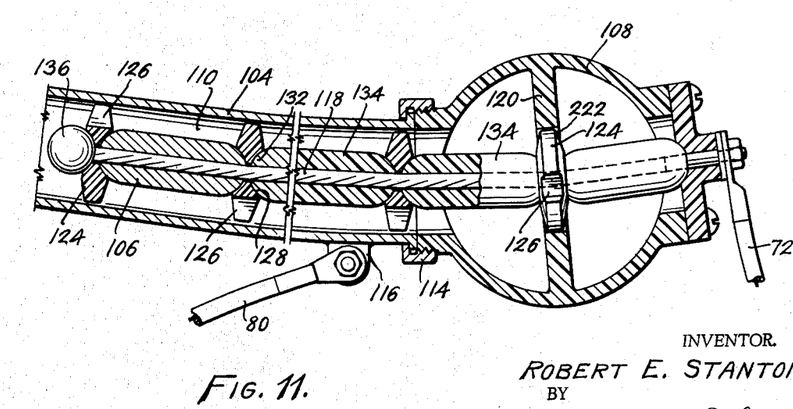
FIGURE 11 is an enlarged fragmentary section of the modified electrolysis cell of the FIGURE 9 modification.

FIGURES 9, 10 and 11 illustrate the manner in which cell 22b can be used with a brine tank 20b similar in most respects to the brine tank 20 of FIGURE 4. Brine tank 20b includes the vented riser passage 26, passage 28 communicating therewith and with the interior of the tank to introduce the water into the bottom of the tank and such other features (not shown) as the wire basket, mean for puncturing the salt container and spring clip to hold the punctured aperture open as may be desired. Vertically disposed down-comer 64b is connected into the wall of the tank in position to draw off the brine therefrom and carry it downwardly into the lower end of cathode forming tube 104.

This cathode tube is preferably formed of stainless steel while the anode 106 is again preferably carbon. All of the remaining parts of the apparatus with the exception of the conductors, conductor terminals and the like are non-conducting plastic as before.

The preferred arrangement is to wind the cathode tube spirally around the outside of the brine tank as shown most clearly in FIGURE 9. This, of course, necessitates a flexible anode, one form of which has been illustrated in FIGURE 11.

The lower end of the cathode tube is connected to the corresponding end of down-comer 64b by a conventional hose coupling 114. The upper end is similarly connected to separation chamber 108 which is attached to the brine tank in position such that the low-density foaming reaction mixture can rise therein to a level somewhat above the level of the brine in the tank 20b. A terminal 116 is attached to the wall of the cathode tube for purposes of detachably receiving the negative conductor 80.

The positive conductor 72 is connected to a current-carrying cable 118 which extends downwardly through the cathode tube and carries current to the anode 106. Current-carrying cable 118 is insulated from tube 104 and chamber 108 throughout its entire length. Chamber 108, being fabricated from plastic, is no problem although in the particular form shown it includes a partition-forming portion 120 that contains an opening 122 housing an insulator 124 through which the stainless steel cable passes. The insulators 124 are plastic or some other suitable insulating material and are disposed at spaced intervals throughout the length of the stainless cable 118.

In the particular form shown, these insulating elements 124 are more or less circular having a diameter slightly less than the inside of tube 104. They have one or more notches 126 in their periphery to permit the free flow of the reaction mixture in annular space 110. Opposite faces of the insulating disks are provided with hemispherical depressions 128 bordering the central cable opening 130 therein and these depressions cooperate with the rounded ends 132 of the elongated carbon anode-forming elements 106 and correspondingly shaped insulators 134 to produce a flexible ball-and-socket connection. The lower extremity of the stainless cable 118 is provided with a ball-type anchor element 136 which articulates within the adjacent depression in insulator 124.

The shape of carbon anode elements 106 and insulator elements 134 is substantially identical although obviously only the carbon elements will conduct current to the electrolyte. Therefore, these carbon anode-forming elements are located on approximately the lower half of the stainless steel cable 118 where the electrolysis reaction is to take place and the non-conducting insulating elements 134 are confined to the upper end of the cable where the chemical reaction between the sodium hydroxide and chlorine is to take place.

The modification of FIGURES 9–12, inclusive, is considerably more compact than that previously described; however, it is somewhat more difficult to adapt to a multiple-cell operation.

Having thus described the several useful and novel features of my method and apparatus for producing and introducing hypochlorite solutions into contaminated water, it will be seen that the several worthwhile objectives for which it was designed have been achieved. Although but a few specific embodiments of my invention have been illustrated and described in connection with the accompanying drawings, I realize that certain other modifications may well occur to those skilled in the art within the broad teaching hereof; therefore, it is my intention that the scope of protection afforded hereby shall be limited only insofar as such limitations are expressly set forth in the appended claims.

What is claimed is:

1. Apparatus for manufacturing a hypochlorite solution from a water-soluble electrically-decomposable metallic chloride salt and for introducing such solution into a confined body of water for purposes of purifying same which comprises, an immersible brine tank adapted to receive a charge of salt, said tank including means adapted to introduce the water in which said tank is immersed into the bottom thereof while preventing the return flow of brine, therethrough, said last means comprising vented conduit means opening beneath the water surface and a second conduit forming means connected into said vented conduit means at a point beneath the level to which the water rises therein while opening into the interior of said tank at a level spaced beneath the point of connection with said vented conduit, at least one electrolysis cell containing an upstanding cathode and anode operative upon the application of a suitable electrical potential therebetween to decompose the brine into the hydroxide of the salt's cation together with hydrogen and chlorine gases, means interconnecting the brine tank and at least one of the cells adapted to introduce the brine into the said one cell adjacent the lower end of the electrodes, buoyant supporting means attached to the brine tank and electrolysis cells adapted to float same partially submerged in a body of water, liquid discharge means connected into at least one cell in position to receive the liquid hypochlorite reaction product resulting from the chemical combination of the hydroxide and chlorine gas and deliver said product to the confined body of water being treated at a point underneath the surface thereof, and gaseous-discharge means connected into each cell above the liquid level therein adapted to receive the remaining unreacted gaseous products evolved during the electrolysis and deliver same into said body of water in which said cell is immersed adjacent the outside surface thereof so as to cause circulation sufficient to maintain the temperature inside said cell at a level effective to inhibit hypochlorate formation.

2. The apparatus as set forth in claim 1 in which the brine tank is of a size and shape adapted to receive a charge of table salt packaged in a cylindrical cardboard dispensing carton and in which carton puncturing means are provided in the brine tank positioned and adapted to cut a hole in the cardboard carton for the introduction of water when said carton is placed in said tank, said carton puncturing means including a projection located to enter the punctured opening and adapted to hold same open until the carton is removed.

3. The apparatus as set forth in claim 2 in which the second conduit-forming means enters the brine tank adjacent the carton puncturing means so water will immediately flow into the punctured opening in the dispensing carton produced by said puncturing means.

4. The apparatus as set forth in claim 1 in which each cell is of a shape designed to provide a steadily increasing cross-sectional area from the bottom to the top thereof, whereby the reaction mixture will rise in the cell at a relatively uniform rate despite the continuous introduction of gaseous reaction products evolved during the electrolysis.

5. The apparatus as set forth in claim 4 in which the cell is generally wedge-shaped including a pair of spaced substantially parallel vertical walls interconnected along their side edges by upwardly divergent oppositely inclined walls, said cell having a partition wall extending between the vertical walls in spaced substantially parallel to one of said inclined walls while terminating short of the cell bottom to define a downwardly inclined passage, said electrodes being attached to said partition wall and said other inclined wall in face-to-face relation.

6. The apparatus as set forth in claim 1 in which the electrolysis cell comprises an upwardly inclined tubular member fabricated from electrically-conductive material forming one electrode and a rod-like second electrode disposed axially within said first electrode and supported in insulated relation thereto.

7. The apparatus as set forth in claim 6 in which the rod-like electrode comprises a flexible electrically-conductive cable upon which are laced a plurality of short centrally-apertured carbon rod segments separated by non-conductive disks with their peripheral edges engaging the inner cylindrical surface of the tubular electrode to maintain the rod-like electrode centered therein.

8. The apparatus as set forth in claim 7 in which the carbon rod segments have hemispherical end portions and the disks are provided with correspondingly shaped depressions on opposite faces thereof, said depressions and hemispherical end portions cooperating to define ball-and-socket joints therebetween.

9. The apparatus as set forth in claim 6 in which the means interconnecting the brine tank and cell comprises an upright tubular member having its upper end disposed to receive brine overflowing said brine tank and its lower end connected to deliver said brine into the lower end of the tubular electrode.

10. The apparatus as set forth in claim 1 in which a water permeable basket of a size and shape adapted to receive a cylindrical cardboard table salt dispensing carton is removably mounted within the brine tank.

11. The apparatus as set forth in claim 1 in which the electrodes are arranged within the cell in transversely spaced upwardly divergent relation.

12. The apparatus as set forth in claim 1 in which a plurality of serially interconnected cells are grouped circumferentially around the brine tank, the first cell of the series receiving the brine from the brine tank, the last cell of the series discharging the hypochlorite to the said confined body of water, and each cell of the series being adapted to perform partial electrolytic decomposition of successive unreacted portions of said brine.

References Cited by the Examiner

UNITED STATES PATENTS

| | | | |
|---|---|---|---|
| 892,983 | 7/1908 | Digby | 204—95 |
| 2,701,790 | 2/1955 | Goument | 204—95 |
| 2,799,643 | 7/1957 | Roetzsch | 204—270 |
| 2,873,236 | 2/1959 | Ferris | 204—95 |
| 2,934,409 | 4/1960 | Biehl | 210—242 |
| 3,055,821 | 9/1962 | Holmes et al. | 204—270 |

JOHN H. MACK, *Primary Examiner.*

JOHN R. SPECK, *Examiner.*

WINSTON A. DOUGLAS, T. TUNG,
*Assistant Examiners.*